(12) United States Patent
Wilson et al.

(10) Patent No.: US 10,373,731 B1
(45) Date of Patent: Aug. 6, 2019

(54) SYSTEMS WITH HIDDEN SIGNAL PATHS

(71) Applicant: Apple Inc., Cupertino, CA (US)

(72) Inventors: James R. Wilson, Cupertino, CA (US);
Christopher D. Jones, Los Gatos, CA (US); Gary L. Burkholder, Morgan Hill, CA (US); Derek C. Scott, Santa Clara, CA (US); David G. Havskjold, Portola Valley, CA (US); Glen A. Rhodes, San Francisco, CA (US); Forrest C. Wang, Petaluma, CA (US); Ryan J. Garrone, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 42 days.

(21) Appl. No.: 15/654,536

(22) Filed: Jul. 19, 2017

Related U.S. Application Data

(60) Provisional application No. 62/372,465, filed on Aug. 9, 2016.

(51) Int. Cl.
| | |
|---|---|
| *H04B 10/00* | (2013.01) |
| *H01B 5/14* | (2006.01) |
| *H02J 50/30* | (2016.01) |
| *G02B 5/20* | (2006.01) |
| *G02B 6/42* | (2006.01) |
| *H02J 50/10* | (2016.01) |
| *H04B 10/80* | (2013.01) |
| *H04B 10/25* | (2013.01) |
| *B60J 1/02* | (2006.01) |
| *B60R 16/03* | (2006.01) |

(Continued)

(52) U.S. Cl.
CPC .................. *H01B 5/14* (2013.01); *B60J 1/02* (2013.01); *B60R 16/03* (2013.01); *G02B 5/208* (2013.01); *G02B 6/42* (2013.01); *H02J 50/10* (2016.02); *H02J 50/30* (2016.02); *H04B 10/25* (2013.01); *H04B 10/807* (2013.01); *B60R 1/04* (2013.01); *H02J 7/025* (2013.01)

(58) Field of Classification Search
CPC ... H01B 5/14; H02J 50/10; H02J 50/30; B60J 1/02; B60R 16/03; G02B 5/208; G02B 6/42; H04B 10/25
USPC ....................................................... 398/115
See application file for complete search history.

(56) References Cited

U.S. PATENT DOCUMENTS

| | | |
|---|---|---|
| 4,692,798 A | 9/1987 | Seko et al. |
| 6,672,745 B1 | 1/2004 | Bauer et al. |
| 7,199,767 B2 | 4/2007 | Spero |

(Continued)

*Primary Examiner* — Tesfaldet Bocure
(74) *Attorney, Agent, or Firm* — Treyz Law Group, P.C.; G. Victor Treyz; Michael H. Lyons

(57) ABSTRACT

A system such as a vehicle system may include a window. The window may have glass layers and an interposed polymer layer. Signal paths that contact the polymer layer may be formed within the window. The signal paths may be electrical signal paths formed from wires or patterned conductive traces. The conductive traces may be portions of an infrared-light-blocking layer formed from a conductive film or may be patterned from other conductive thin-film layers. The signal paths may include optical waveguides formed from optical fibers embedded in the polymer or transparent thin-film layers on the glass layers or other substrates. Openings may be formed in the glass layers to allow signal paths to pass to an electrical component. The electrical component may also be wirelessly coupled to the signal paths.

20 Claims, 10 Drawing Sheets

(51) Int. Cl.
*H02J 7/02* (2016.01)
*B60R 1/04* (2006.01)

(56) References Cited

U.S. PATENT DOCUMENTS

| | | | |
|---|---|---|---|
| 7,221,363 B2 | 5/2007 | Roberts et al. | |
| 7,847,745 B2 * | 12/2010 | Martin | B32B 17/10036 |
| | | | 343/711 |
| 8,436,747 B2 | 5/2013 | Schoepp | |
| 9,977,248 B1 * | 5/2018 | Xie | G02B 27/0172 |
| 2002/0097962 A1 * | 7/2002 | Yoshimura | G02B 6/10 |
| | | | 385/50 |
| 2003/0111160 A1 | 6/2003 | Bolognese et al. | |
| 2009/0122430 A1 * | 5/2009 | DeWard | B60R 11/04 |
| | | | 359/871 |
| 2009/0136657 A1 * | 5/2009 | Slafer | B82Y 10/00 |
| | | | 427/124 |
| 2010/0177255 A1 * | 7/2010 | Tamir | E06B 9/24 |
| | | | 349/18 |
| 2011/0148218 A1 | 6/2011 | Rozbicki | |

* cited by examiner

SYSTEMS WITH HIDDEN SIGNAL PATHS

This application claims benefit to provisional patent application No. 62/372,465, filed Aug. 9, 2016, which is hereby incorporated by reference herein in its entirety.

FIELD

This relates generally to transmitting signals, and, more particularly, to systems with hidden signal paths.

BACKGROUND

In vehicles, building systems, portable electronic devices, and other systems, it is often desirable to convey data and power signals over signal paths. For example, wires may be used to convey data and power signal within a system.

It can be challenging to incorporate signal paths into many systems. In some situation, it can be impractical to route wires to components because the components are in inaccessible system locations. In other situations, components that require power and data connections are mounted on clear glass structures, so that wires would be unsightly if routed to the components.

SUMMARY

A system such as a vehicle system may include a window. The window may separate an interior portion of the system from an external environment. The window may have transparent layers such as glass layers that are joined using a polymer layer to create a laminated window.

Signal paths may be formed within the polymer layer (e.g., silver traces or other metal traces may be formed on the glass layers or metal wires may pass through the polymer layer). The signal paths may be used to convey power and/or data between an electrical component on the window and another electrical component in the system. The signal paths may be invisible to a user of the system, allowing the electrical component to be mounted in a prominent location on the window without creating unsightly signal lines.

The signal paths may be electrical signal paths formed from patterned conductive traces on the surfaces of the glass layers that face the polymer layer. Conductive traces, which may be contacted by the polymer layer, may be formed from portions of a conductive infrared-light-blocking layer or other conductive thin-film layers.

The signal paths may include optical waveguides formed from optical fibers or transparent thin-film layers. The optical fibers may be embedded within the polymer layer and the optical waveguides may be formed from thin-film coatings on the surfaces of the glass layers facing the polymer layer.

Openings may be formed in the glass of the window. Signal paths may be coupled to the electrical component through the openings. The electrical component may also be wirelessly coupled to signal paths in the window. Power may be supplied wirelessly to the electrical component through the window or through free space. For example, circuitry in the system may supply the electrical component with light or wirelessly transmitted electromagnetic power signals. The electrical component may also include solar cells, thermoelectric power generators, or other power generation circuitry to generate power within the electrical component. A battery may be used to store power for later use.

The electrical component may be incorporated into a rear-view mirror or other component in a vehicle or other system. The electrical component may include a camera, may include a rain sensor, may include a light sensor, or may include any other suitable electrical device for a vehicle or other system.

DETAILED DESCRIPTION

Figure 1:
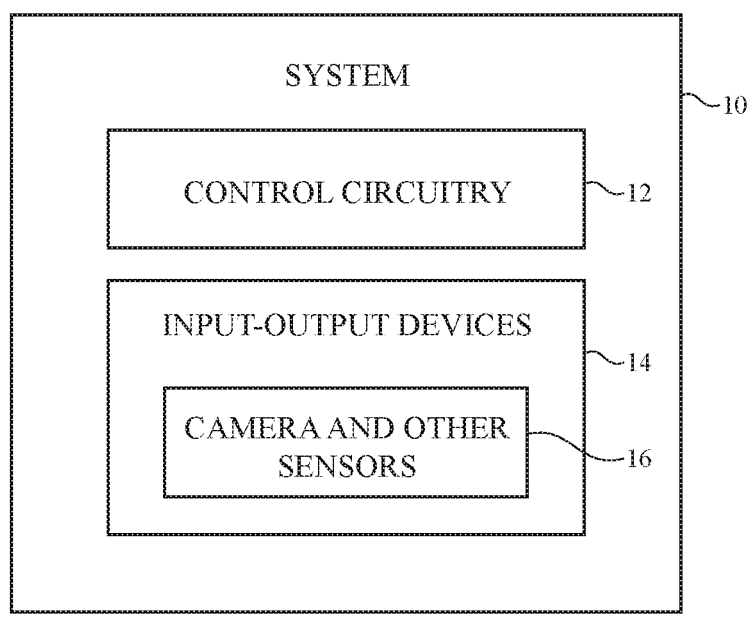
FIG. 1 is a schematic diagram of an illustrative system in accordance with an embodiment.

A system may have electrical components. The electrical components may be coupled to control circuitry, power sources, and other supporting circuitry in the system using wired and/or wireless paths. An illustrative system is shown in FIG. 1. System 10 of FIG. 1 may be an automobile, truck, airplane, or other vehicle that has windows, body panels, or other structures on which electrical components are mounted, may be a building with windows on which electrical components are mounted, or may be another system that includes windows, other transparent structures, electrical components, and other electrical equipment.

In some scenarios, portions of system 10 include transparent glass layers and/or other transparent layers through which it is desired to convey power and/or data signals. In other configurations, portions of system 10 include opaque structures through which it is desired to convey power and/or data signals. Scenarios in which an electrical components such as cameras, rain sensors, light sensors, and other components are mounted on transparent layers such as the windows of a vehicle and in which wired and/or wireless signal paths are used in conveying power and/or data signals to and/or from the electrical components may sometimes be described herein as an example. This is merely illustrative. Systems such as system 10 may include any suitable components and may use any suitable arrangement for forming signal paths between the components and other system circuitry.

As shown in FIG. 1, system 10 may include control circuitry 12. Control circuitry 12 may include storage and processing circuitry for supporting the operation of system 10. The storage and processing circuitry may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 12 may be used to control the operation of system 10. The processing circuitry may be based on one or more microprocessors, microcontrollers, digital signal processors, baseband processors, power management units, audio chips, application specific integrated circuits, etc.

In some configurations, system 10 may include electrical components such as input-output devices 14. Input-output devices 14 may allow data to be supplied to system 10 and to a user and may allow data to be provided from system 10 to external systems or a user. Input-output devices 14 may include buttons, scrolling wheels, touch pads, key pads, keyboards, and other user input devices. Microphones may be used to gather voice input from a user and may gather information on ambient sounds. Output may be supplied by devices 14 using audio speakers, tone generators, vibrators, haptic devices, displays, light-emitting diodes and other light sources, and other output components. Devices 14 may include wired and wireless communications circuitry that allows system 10 (e.g., control circuitry 12) to communicate with external equipment and that allows signals to be conveyed between components (circuitry) at different locations in system 10.

Input-output devices 14 may include sensors 16. Sensors 16 may include cameras (digital image sensors), light detectors, magnetic sensors, accelerometers (motion sensors), force sensors, touch sensors, radar sensors, lidar sensors, acoustic sensors (e.g., ultrasonic parking sensors), temperature sensors, gas sensors, magnetic sensors, compasses, pressure sensors, moisture sensors (e.g., rain sensors), humidity sensors, sensors for measuring vehicle speed and direction, and other suitable sensors. Input-output devices 14 may also include electrochromic mirror and window dimmers and other dimmable layers (light modulators), may include components for opening and closing garage doors (e.g., components that transmit wireless commands to garage door systems), wireless circuitry for communicating with toll booths and parking garages, wireless circuitry for supporting vehicle-to-vehicle and vehicle-to-network communications, and/or other electrical components. In configurations in which system 10 is a vehicle system, system 10 may include a steering wheel, brakes, gasoline and/or electric motors, batteries, fuel tanks, transmission systems, and other vehicle systems.

Figure 2:
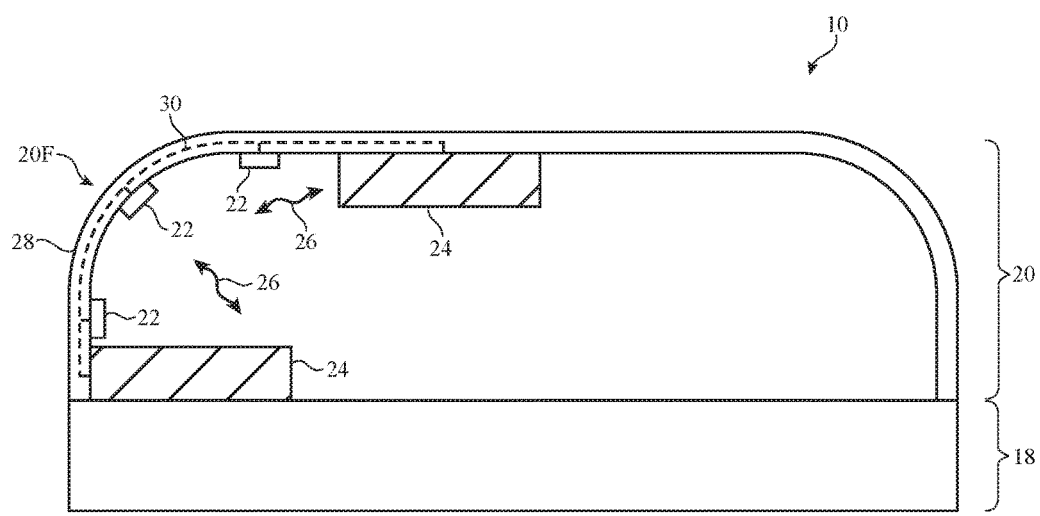
FIG. 2 is a cross-sectional side view of an illustrative system with components in accordance with an embodiment.

A simplified side view of system 10 is shown in FIG. 2. As shown in FIG. 2, system 10 may include portions such as portions 18 and 20. Portion 18 may include wheels, a chassis coupled to the wheels, propulsion and steering systems, and other vehicle systems. Portion 20 may include a body (e.g., doors, trunk structures, a hood, side body panels, a roof, and/or other upper portions of a vehicle). Seats may be formed in the interior of portion 20. Portion 20 may include windows such as window(s) 28. Window 28 may separate the interior of portion 20 from the exterior environment surrounding system 10.

Window 28 may be formed from one or more layers of transparent glass, clear plastic (e.g., polycarbonate), and/or other materials. In some arrangements, window(s) 28 may include laminated window structures such as one or more layers of glass with interposed polymer layer(s). The polymer in a laminated window may be, for example, a polymer such as polyvinyl butyral (PVB) or ethylene-vinyl acetate (EVA).

System 10 may include one or more electrical components such as components 22. Components 22 may include, for example, control circuitry and/or integrated circuits and other components such as one or more of input-output devices 14. Components 22 may include rear-view mirrors, rain sensors, camera sensors, light sensors, buttons, displays, and/or other input-output devices 14. Components 22 may be mounted within any suitable portion of system 10 (e.g., portion 18 and/or portion 20). Components 22 may, for example, be mounted under a hood panel, under a door panel, under a trunk panel, or under other suitable body panels, may be mounted to the chassis of system 10, may be mounted in a trunk or engine compartment, within a door cavity, or elsewhere within system 10. With one illustrative configuration, which is illustrated in FIG. 2, components 22 may include one or more components mounted on window 28. Components 22 may be mounted at the rear of a vehicle (e.g., on a rear window), on the top (roof) of a vehicle (e.g., on a moon roof window or on a portion of a front, rear, or side window that is extended over the top of a vehicle), may be mounted on a side window and/or may be mounted on a front window such as window 28 (e.g., a window that covers the front of a vehicle front portion 20F in system 10).

Support structures such as window 28 may be formed form plastic, metal, glass, carbon-fiber composite material and/or other fiber composites, and/or other materials. Illustrative configurations for system 10 in which window 28 is formed from a clear layer of material such as a clear window material (e.g., laminated glass) may sometime be described herein as an example.

In addition to components 22, system 10 may include other components such as components 24 (e.g., portions of control circuitry 12 and/or input-output devices 14 of FIG. 1 and/or other resources that are not included in components 22). System 10 (e.g., components 24 or other electrical equipment external to components 22) may include circuitry that communicates with components 22 and/or that conveys power to components 22. Wireless and/or wired paths may be used to support the transfer of data between components 24 and components 22 and/or may be used to support power transfer operations. For example, power and/or data may be conveyed between components 24 and components 22 using hardwired paths such as paths 30 in window 28 and/or wireless paths such as wireless paths 26.

Hardwired paths 30 may include wires, metal signal traces, traces formed from silver nanowires, traces formed from conductive ink, thin-film conductive traces formed from indium tin oxide and other transparent conductive materials, and other conductive paths for conveying electrical signals. Paths 30 may also include optical fibers and other optical waveguides for conveying optical signals.

Wireless paths 26 may be based on the transmission of radio-frequency electromagnetic signals or other electromagnetic signals or may be based on free-space light transmission. Components 24 may be located on the roof of system 10 (e.g., in the leading edge portion of the interior cavity formed between a headliner and exterior roof panel in the roof of a vehicle), may be mounted in a dashboard, may be mounted in a door, or may be mounted in other portions of the body of a vehicle. These locations may be adjacent to window 28 (e.g., in the vicinity of components 22) to minimize the lengths of hardwired paths 30 and/or to enhance wireless signal transmission and reception for wireless paths 26. In non-vehicle systems, components 24 may be located at other locations that are in relatively close proximity to component(s) 22 on window 28 or other support structure.

In configurations in which paths 30 run across a portion of a transparent support structure such as window 28, there is a possibility that paths 30 will be visible to a user. To prevent unsightly paths, wireless paths 26 may be used to convey signals between components 22 and 24 and/or hardwired paths 30 may be formed from transparent structures that are invisible or nearly invisible to the unaided eye (e.g., optical waveguides and/or conductive signal lines that are transparent, optical waveguides and other structures that have refractive index values that match or nearly match those of the material(s) of windows 28), etc.

Using paths such as hardwired paths 30 and/or wireless paths 26, power may be conveyed from components 24 to components 22 (and, if desired, from components 22 to components 24). Data may also be conveyed between components 22 and components 24 using hardwired paths 30 and/or wireless paths 26. For example, a camera in component 22 may gather image data in real time and may supply this image data to component(s) 24. Paths 30 may be used for conveying both power and data, paths 26 may be used for conveying both power and data, paths 30 may be used to convey data while paths 26 convey wireless power, or paths 30 may be used to convey power while paths 26 convey wireless data.

Figure 3:
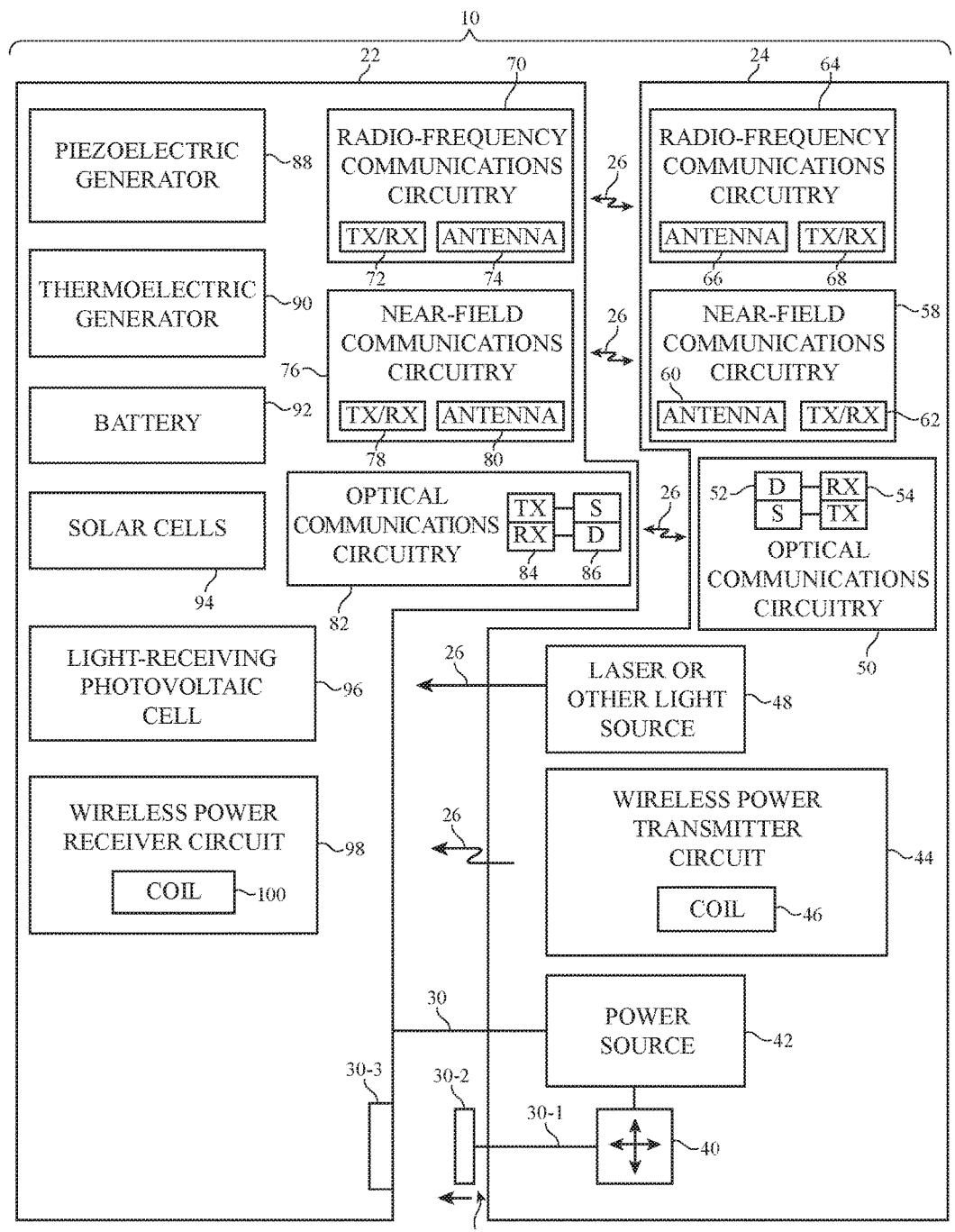
FIG. 3 is a schematic diagram of illustrative circuitry for conveying power and data signals over signal paths in accordance with an embodiment.

FIG. 3 is a schematic diagram showing illustrative circuitry of the type that may be used in system 10 in a configuration in which components 22 and 24 are communicating and exchanging power using wireless paths 26 and/or wired paths 30. The circuitry of FIG. 3 is merely illustrative. Components 22 and 24 may have additional circuits or may have fewer circuits, if desired.

As shown in FIG. 3, component 24 may supply power to component 22 using a wired path. For example, component 24 may have a power source such as power source 42. Power source 42 may be a direct-current (DC) power supply that delivers power from an internal battery in system 10 and/or that converts power from a gasoline engine into DC power. Power source 42 may also use solar cells or other components to deliver power.

With one illustrative configuration, power source 42 supplies power directly to component 22 using a wired path 30. With another illustrative configuration, component 22 is intermittently coupled to power source 42. With this type of arrangement, component 24 may have a connector such as connector 30-2 that is configured to couple with mating connector 30-3 in component 22. Connector 30-2 may be coupled to an end of cable 30-1. An opposing end of cable 30-1 may receive power from power source 42, via positioning system 40. When it is desired to decouple components 22 and 24, positioning system 40 may retract connector 30-2 from connector 30-3. When it is desired to couple components 22 and 24 together, positioner 40 may move outwardly so that connector 30-2 mates with connector 30-3. Once coupled in this way, power from power source 42 may be conveyed to component 22.

Component 22 may, if desired, include a battery such as battery 92. Battery 92 may be charged by power from power source 42 and/or from power generated by circuitry within component 22 and may be used to deliver power to the circuits of component 22 when other sources of power are not available or are insufficient. When wired power is available over paths 30, circuitry in component 22 may be powered from power source 42.

Circuitry in component 22 may also be powered using power generated by devices within component 22. Component 22 may, for example, have one or more solar cells 94 that convert ambient light such as sunlight into power.

As another example, component 22 may have a light-receiving photovoltaic cell 96 that produces power based on received light from a laser or other light source 48 in component 24. Light source 48 may transmit light to cell 96 over a free space path or through an optical waveguide associated with window 28.

A motion-based generator such as piezoelectric generator 88 or other generator may be used to convey kinetic energy (vibrations, up and down motions and other motions associated with use of a vehicle on a roadway, etc.) to electrical power.

Component 22 may include a solid state device that produces power from heat (e.g., thermoelectric generator 90).

Wireless power for component 22 may be transmitted from component 24 and received by component 22 using wireless power transmitter circuit 44 in component 24 and wireless power receiver circuit 98 in component 22. Wireless power transmitter circuit 44 may include a transmitter that converts DC power into alternating-current (AC) signals that are wirelessly transmitted using coil 46. Coil 100 may be electromagnetically coupled (inductively coupled) to coil 46 and may receive the wirelessly transmitted AC signals. A rectifier circuit in circuit 98 may convert the received wirelessly transmitted AC signals and can convert these signals into DC power for charging battery 92 and for powering the circuitry of component 22. If desired, capacitive coupling arrangements may be used for transmitting power wirelessly. The use of coils (inductors) such as coils 46 and 100 to form an inductively coupled power transfer system is merely illustrative.

Data may be conveyed between components 24 and 22 using wireless communications circuitry. For example, component 24 may have radio-frequency communications circuitry 64 (e.g., Bluetooth® circuitry or other communications circuitry) that uses radio-frequency transceiver circuitry 68 and antenna 66 to transmit and receive wireless signals. Component 22 may have corresponding wireless communications circuitry 70 for communicating with circuitry 64. For example, component 22 may have radio-frequency communications circuitry 70 (e.g., Bluetooth® circuitry or other communications circuitry) that uses radio-frequency transceiver circuitry 72 and antenna 74 to transmit wireless signals to circuitry 64 and to receive wireless signals that have been transmitted by circuitry 64.

As another example, component 24 may have near-field communications circuitry 58. Circuitry 58 may operate in a near-field communications band such as a band at 13.56 MHz or other suitable frequency band and may use near-field communications transceiver circuitry 62 and near-field communications antenna 60 (e.g., a loop antenna with one or more turns) to transmit and receive wireless signals. Component 22 may have corresponding near-field communications circuitry 76 that uses near-field communications transceiver 78 and near-field communications antenna 80 (e.g., a loop antenna) to transmit wireless signals to circuitry 58 and to receive wireless signals that have been transmitted by circuitry 58.

Optical communications may be supported over hardwired (waveguide) paths and/or through free space. Component 24 may have optical communications circuitry 50 and component 22 may have corresponding optical communications circuitry 82. Circuitry 50 may have a transceiver such as transceiver 54. A transmitter TX in circuitry 54 may use a light source (S) in optical transmitter/receiver circuitry 56 to transmit light to a corresponding detector (D) in optical transmitter/receiver circuitry 86 of circuitry 82. Receiver RX in circuitry 84 may use detector D to receive the transmitted signals from circuitry 50. Transmitter TX in circuitry 84 may use a light source (S) in circuitry 86 to transmit light signals to detector D in circuitry 52. Receiver RX in circuitry 54 may use detector D to receive signals transmitted from circuitry 82.

Figure 4:
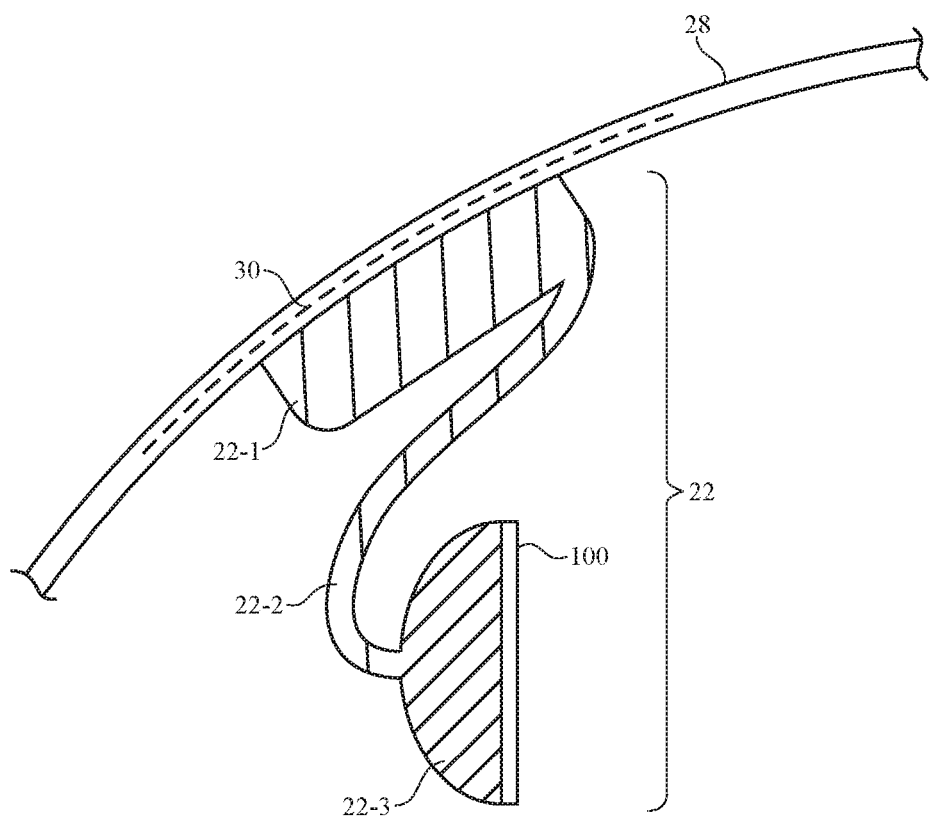
FIG. 4 is a cross-sectional side view of an illustrative component such as a rear view mirror or other electrical device mounted on a supporting structure such as a glass window in accordance with an embodiment.

As shown in FIG. 4, component 22 may be a rear-view mirror mounted on window 28. Hardwired paths 30 (e.g., conductive signal lines, optical waveguides, etc.) and other structures (e.g., coils 100, antennas 74 and 80, etc.), transparent solar cells or other solar cells 94, and/or other structures for component 22 may be formed in window 28. Paths 30 and other structures in window 28 may, if desired, be formed from transparent conductive materials such as indium tin oxide and/or conductive thin-films based on silver and/or other materials (conductive ink, silver nanowires, etc.). Component (rear-view mirror) 22 of FIG. 4 may have a base portion such as base 22-1 that is mounted to the inner surface of window 28, may have a thin stalk such as stalk 22-2, and may have a reflective mirror portion such as mirror mount portion 22-3 with mirror 100. One or more portions of the circuitry of FIG. 3 and other component circuitry (see, e.g., control circuitry 12 and input-output devices 14 of FIG. 1) may be incorporated into base 22-1, stalk 22-2, and/or mirror mount portion 22-3. For example, a camera (e.g., a camera that gathers real time driving information for autonomous vehicle systems), a rain sensor, a light sensor, display, buttons, a compass sensor, a light modulator for mirror 100, and other electrical devices may be mounted in portions 22-1, 22-2, and/or 22-3. If desired, configurations in which rear-view mirrors have other shapes (e.g., configurations in which stalk 22-2 is omitted, etc.) and/or in which mirror 100 is omitted may also be used in system 10. The rear-view mirror configuration of FIG. 4 is merely illustrative.

Components such as illustrative component 22 of FIG. 4 may sometimes be located in prominent positions on window 28, so it may be desirable to hide signal paths from view from a user. As described in connection with the hardwired and wireless circuitry of FIG. 3, hardwired paths 30 may be formed from structures that are difficult or impossible to view and/or data and/or power may be transferred wirelessly so that some or all of paths 30 may be omitted.

Window 28 may be coated with one or more transparent conductive layers. These layers may, for example, include a layer such as an indium tin oxide layer or other transparent layer that can be ohmically heated (e.g., to defrost window 28, to enhance the speed with which an electrochromic window dimmer changes state, etc.) and may include a silver layer or other low-e coating layer that blocks infrared light. Conductive layers such as these may be deposited as thin-film coatings on a glass layer or other transparent substrate layer in window 28 and/or may be formed on plastic films or other carriers that are incorporated into one of the layers of window 28.

Figure 5:
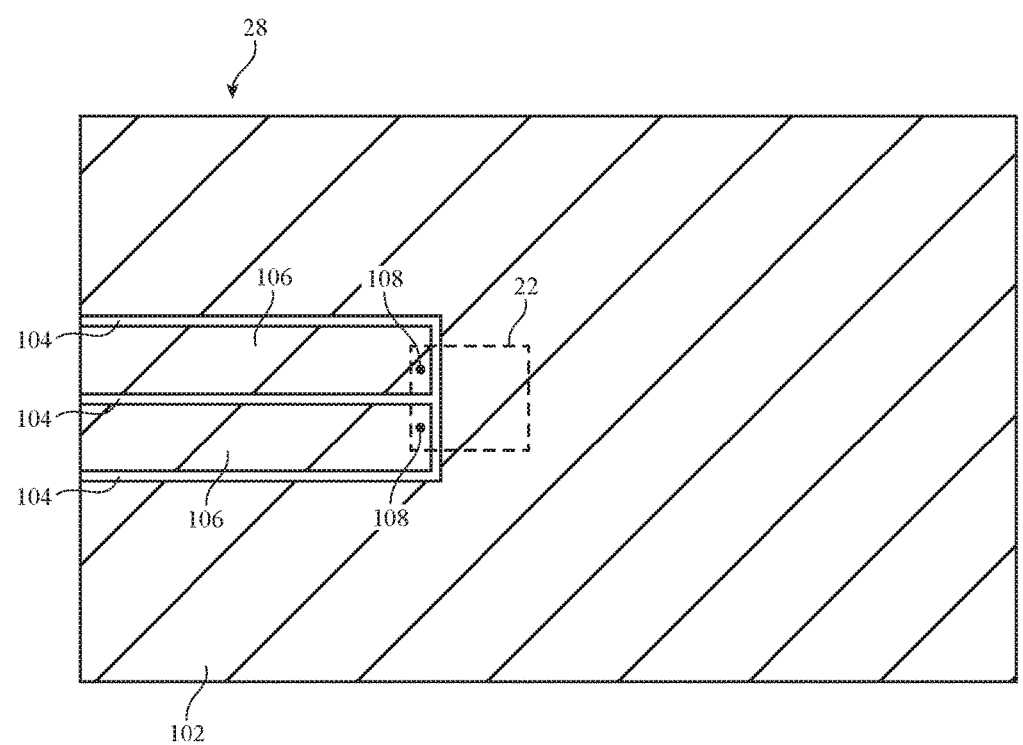
FIG. 5 is a top view of an illustrative window showing how a conductive layer on the window may be patterned to form signal paths for data transmission and/or power transmission in accordance with an embodiment.

In configurations for window 28 in which window 28 has one or more conductive layers (e.g., thin-film coatings or other layers embedded in window 28), the conductive layer(s) may be patterned to carry power and/or data signals. Consider, as an example, window 28 of FIG. 5. As shown in FIG. 5, window 28 may have a transparent conductive coating or other transparent conductive layer 102. Gaps 104 may be formed in layer 102 to form signal paths 106. Paths 106 may be coupled to terminals 108 of component 22 and may serve as hardwired paths 30 that convey a positive power supply signal and ground power supply signal respectively to component 22 from component 24 (not shown in FIG. 5). Paths 106 may also carry data signals.

Window 28 may include one or more layers, two or more layer, or three or more layers of a hard substrate material such as glass, polycarbonate, or other rigid material (e.g., rigid clear dielectric or other solid dielectric layers). A dielectric layer(s) such as a polymer layer(s) may be used to couple the rigid layers together or the rigid layers may be separated by a gaseous dielectric layer (e.g., the rigid layers may be separated by a solid dielectric separation layer such as a polymer separation layer or may be separated by a gaseous dielectric separation layer such as a an air gap interposed between the rigid layers). Configurations in which window 28 includes two glass (or plastic) layers joined by polymer that is interposed between the glass (or plastic) layers may sometimes be described herein as an example.

Figure 6:
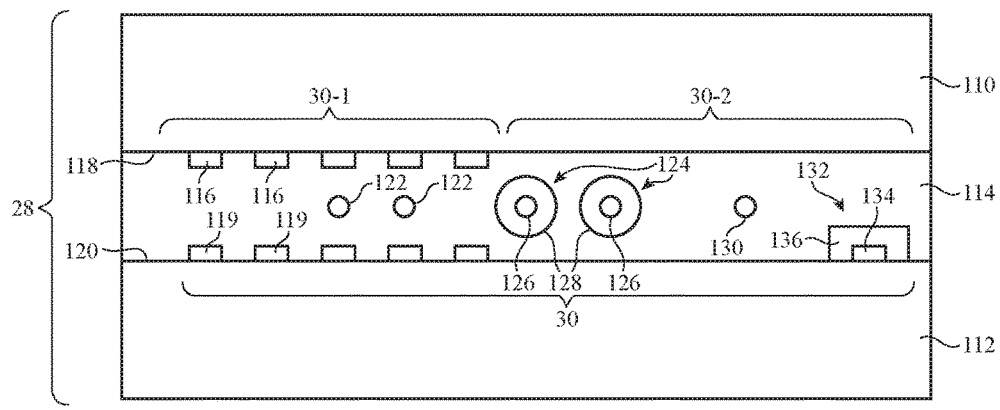
FIG. 6 is a cross-sectional side view of an illustrative window having signal paths in accordance with an embodiment.

A cross-sectional side view of window 28 showing illustrative structures that may be used in forming electrical and/or optical hardwired paths such as paths 30 is shown in FIG. 6. As shown in FIG. 6, paths 30 may include electrical paths 30-1 and/or optical paths 30-2. Window 28 may include an outer clear rigid layer such as outer glass (or polymer) layer 110 and an inner clear rigid layer such as inner glass (or polymer) layer 112. Polymer material 114 (e.g., one or more layers of polyvinyl butyral or ethylene-vinyl acetate) may be used to join layers 110 and 112 to form a layer of laminated safety glass for window 28 or layers such as layers 110 and 112 may be separated by an air gap.

Hardwired signal paths 30 may be formed as patterned thin-film coatings on lower surface 118 of outer glass layer 110 or on outer surface 120 of inner glass layer 112 and/or may be formed using structures that are embedded within material 114. In the example of FIG. 6, illustrative electrical signal paths 30-1 include conductive traces 116 on surface 118 of layer 110 and include conductive traces 119 on surface 120 of layer 112. Traces such as traces 116 and 119 may be formed, for example, from transparent conductive materials such as indium tin oxide and/or metal layers that are sufficiently thin to be transparent (e.g., with a light transmission of more than 70% more than 90% of light, less than 99%, or other suitable amount). Traces such as traces 116 and 119 may also be formed from other materials such as conductive ink (e.g., polymer binder with conductive particles such as metal particles), silver nanowires, etc. If desired, thin wires such as wires 122 may be embedded within layer 114 to carry electrical signals.

Illustrative optical signal paths 30-2 include optical fibers 124. Fibers 124 each include a core 126 and a cladding 128. The index of refraction of core 126 is less than the index of refraction of cladding 128 to support total internal reflection of light rays in core 126. If desired, a fiber may be formed from an unclad core fiber such as illustrative core fiber 130. In this type of configuration, the refractive index of core 130 is preferably greater than the refractive index of layer 114, so that layer 114 may serve as the cladding for the fiber formed from core 130. Optical waveguides may, in general, be formed from fiber structure such as fibers 124, from fibers such as the illustrative fiber formed from core 130, and/or from other optical waveguide structures. If desired, thin-film transparent layers may be used to form optical waveguides on surfaces 118 and/or 120. For example, optical waveguide 132 may be formed from a core material such as core material 134 surrounded on some or all sides by a cladding material such as cladding 136. Waveguide core 134 may have a refractive index that is greater than the refractive index of layer 112 and that is greater than the refractive index of material 136 (in the FIG. 6 example). Optical fibers and other optical waveguides for forming optical paths 130 may be formed from polymers, inorganic materials such as silicon oxide, titanium oxide, aluminum oxide, etc.). The index of refraction values of the structures that form optical paths 130-2 may be sufficiently close to the index refraction values for layers 110, 114, and/or 112 of window 28 to make it difficult or impossible to view paths 130-2 using an unaided eye.

Figure 7:
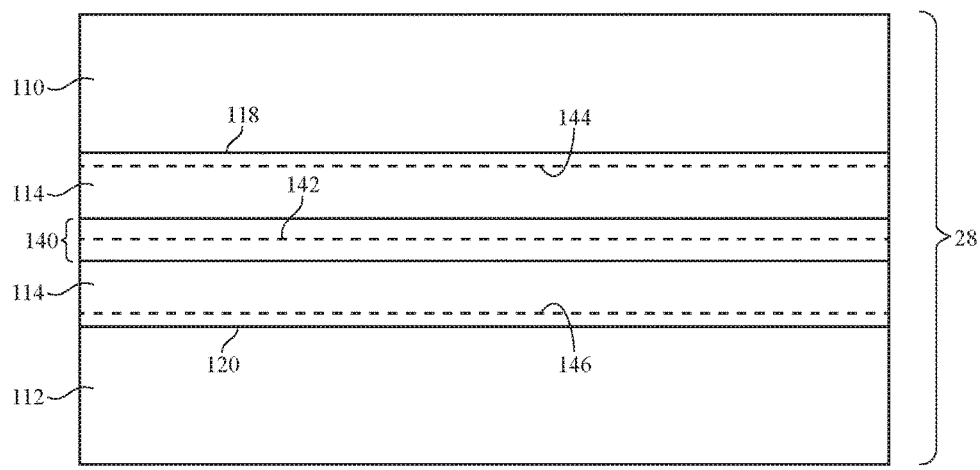
FIG. 7 is a cross-sectional side view of another illustrative window having signal paths in accordance with an embodiment.

In the example of FIG. 7, layer 140 has been embedded within layer 114. Layer 140 may include one or more polymer film substrates (e.g. substrates formed from polyethylene terephthalate (PET) or other polymer films coated with a thin silver layer (or layers) such as layer(s) 142 that serves as an infrared light blocking layer. Infrared light blocking layers (e.g., silver layers or low emissivity layers formed from stacks of silver layers and barrier and seed layers) may be formed on a layer such as layer 140 that is embedded within layer 114 or may be formed as thin-film coatings such as coating layer 144 on surface 118 of layer 110 and/or coating 146 on surface 120 of layer 112. These infrared light blocking layers and/or other conductive blanket films in window 28 (e.g., indium tin oxide ohmic heating layers, conductive thin-film layers associated with electrochromic light modulators, etc.) may include silver or other conductive material and may therefore be patterned to form electrically conductive paths 30-1 of FIG. 6, as described in connection with patterned layer 102 of FIG. 5.

Figure 8:
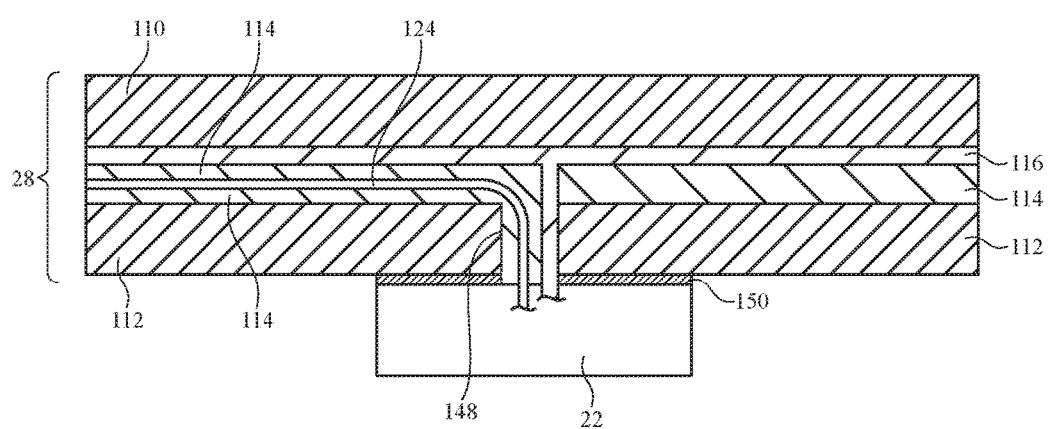
FIG. 8 is a cross-sectional side view of an illustrative window having signal paths and a layer with an opening to accommodate the signal paths in accordance with an embodiment.

In some configurations, one or openings may be formed in the glass of window 28 to permit optical and/or electrical paths 30 to pass from within window 28 to component 22. Openings may be formed using laser drilling, machining, chemical etching, or other suitable techniques. In the illustrative configuration of FIG. 8, opening 148 has been formed in layer 112 to allow optical fiber 124 and conductive trace 116 to pass to component 22. Component 22 may be attached to the inner surface of window 28 using adhesive 150 (as an example).

Figure 9:
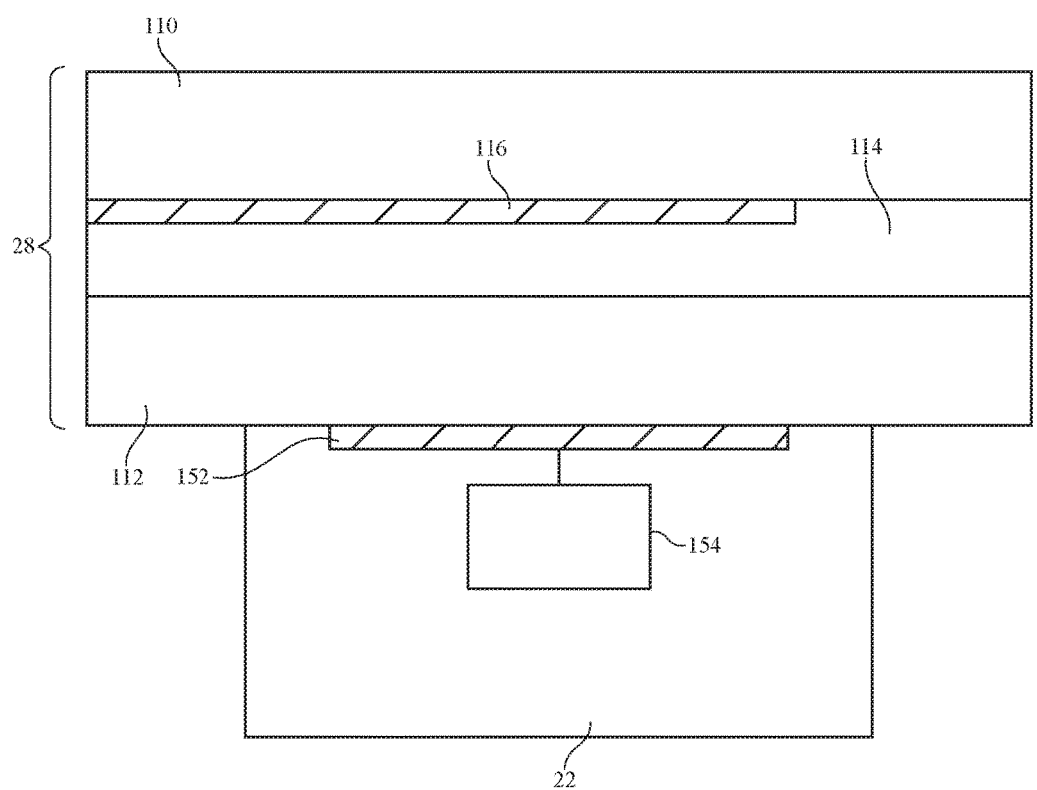
FIG. 9 is a cross-sectional side view of an illustrative window and an electrical component mounted on the window that is electromagnetically coupled to signal paths on the window in accordance with an embodiment.
Figure 10:
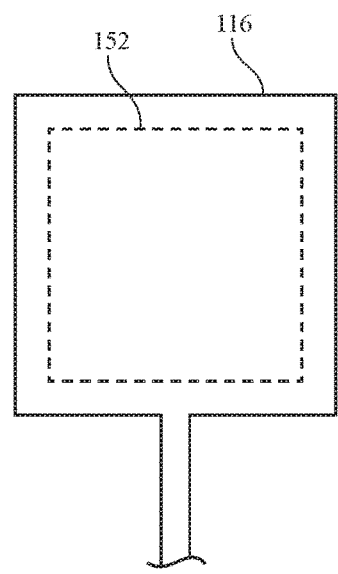
FIG. 10 is top view of an illustrative signal path having capacitively coupled portions in accordance with an embodiment.
Figure 11:
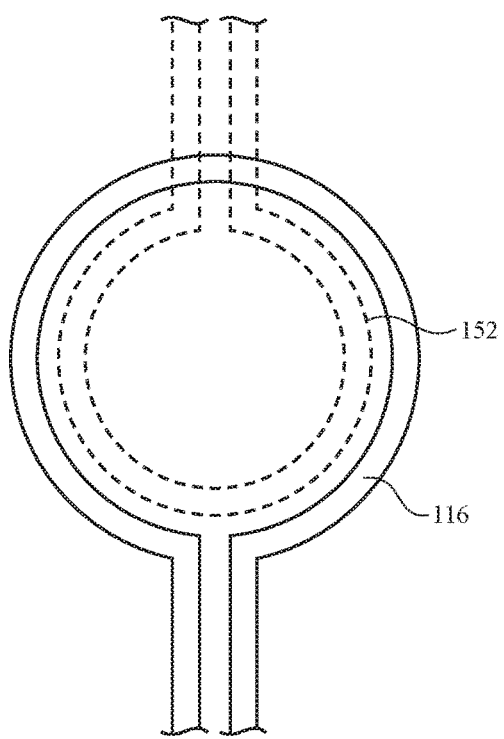
FIG. 11 is a top view of an illustrative signal path having inductively coupled portions in accordance with an embodiment.

If desired, the use of openings such as opening 148 may be reduced or eliminated by forming wireless signal paths through portions of window 28. In the example of FIG. 9, trace 116 and metal pad 152 in component 22 are overlapping and in close proximity to each other and are therefore capacitively coupled. This allows alternating current signals to pass between trace 116 and pad 152 through dielectric layers such as polymer layer 114 and glass layer 112 and allows internal circuitry (component) 154 in component 22 to receive and/or transmit alternating current signals for data and/or power. In capacitive coupling arrangements, it may be desirable for trace 116 and pad 152 to overlap, as shown by illustrative trace 116 and pad 152 in the top view of FIG. 10. Inductively coupled wireless schemes may also be used. In this type of arrangement, trace 116 may have a loop shape and metal 152 in component 22 may have an overlapping loop shape, as show in FIG. 11. Antennas for far-field communications may also be formed using portions of paths 30-1.

Figure 12:
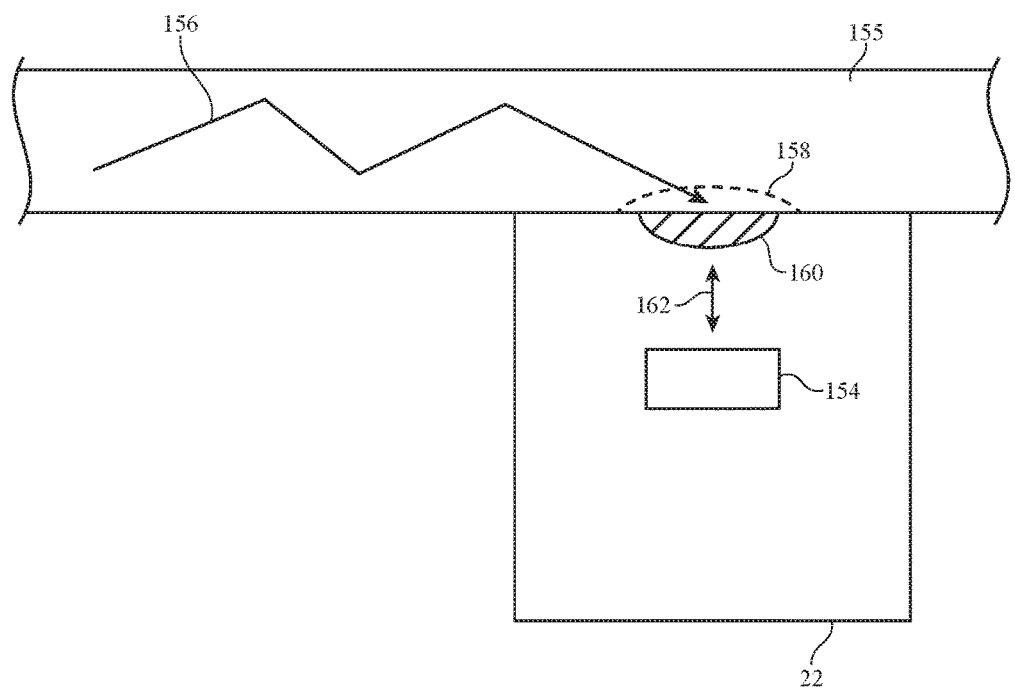
FIG. 12 is a cross-sectional side view of an illustrative optical signal path coupled to an electronic device in accordance with an embodiment.

In optical signal transmission schemes, total internal reflection can be selectively defeated to enhancing optical coupling into and out of an optical waveguide. Consider, as an example, the arrangement shown in the cross-sectional side view of FIG. 12. As shown in FIG. 12, an optical waveguide structure such as waveguide structure 155 (e.g., the structures of signal paths 30-2 of FIG. 6, one or more layers in window 28, etc.) may be locally modified to create modified portion 158 (e.g., by etching or machining away part of structure 155 to form a recessed portion and/or by etching, machining, or otherwise treating the surface of structure 155 to texture the surface of structure 155 in portion 158 and thereby create a non-flat surface structure with high angle surfaces that allow light to escape waveguide structures, etc.) and/or an index-matched material such as material 160 may be placed on an appropriate portion of structure 155. Light 156 may be guided within structure 155 by total internal reflection until reaching portion 158 and/or material 160. When portion 158 and/or material 160 is reached, light 156 will be coupled out of structure 155 and into component 22, as illustrated by light 162, which is aligned with a light transmitter and/or light detector in internal component 154 of component 22. Using an arrangement of the type shown in FIG. 12, component 24 may transmit light signals for power and/or data to component 22. Component 22 may also transmit light signals to component 22. As illustrated by light signals 156, the transmitted light passing between components 24 and 22 may be guided internally in an optical waveguide structure such as structure 155. Light 156 may be visible light, infrared light, or ultraviolet light. As an example, light 156 may be infrared light so that light 156 is invisible to users of system 10 and so that structure 155 is sufficiently transparent to convey light 156 with low loss.

The foregoing is merely illustrative and various modifications can be made to the described embodiments. The foregoing embodiments may be implemented individually or in any combination.

What is claimed is:

1. A system, comprising:
    a window that includes first and second clear solid dielectric layers separated by a dielectric separation layer, wherein the window is configured to transmit light through a lateral surface of the first and second clear solid dielectric layers;
    first and second electrical components; and
    an optical signal path that is embedded within the dielectric separation layer and that is configured to convey light signals between the first and second electrical components.

2. The system defined in claim 1 wherein:
    the first and second clear solid dielectric layers comprise respective first and second glass layers, wherein the dielectric separation layer comprises a polymer layer, and wherein the first electrical component includes a camera.

3. The system defined in claim 2 wherein the first electrical component comprises a first optical communication circuit, wherein the second electrical component comprises a second optical communications circuit, and wherein the first optical communications circuit is configured to transmit the light signals to the second optical communications circuit over the optical signal path.

4. The system defined in claim 3 wherein the camera produces data and wherein the first optical communications circuit transmits the data to the second optical communications circuit using the light signal.

5. The system defined in claim 1 wherein the second electrical component is configured to transmit power to the first electrical component over the optical signal path.

6. The system defined in claim 5 wherein the first electrical component is configured to transmit data to the second electrical component using the light signals.

7. The system defined in claim 1 wherein the second electrical component is configured to provide power to the first electrical component.

8. The system defined in claim 7 wherein the second electrical component has a wireless power transmitter circuit, wherein the first electrical component has a wireless power receiver circuit, and wherein the wireless power transmitter circuit is configured to provide the power by transmitting wireless power signals to the wireless power receiver circuit.

9. The system defined in claim 1 wherein the first electrical component comprises a rear view mirror.

10. The system defined in claim 1 wherein the window comprises a front vehicle window.

11. The system defined in claim 10 wherein the dielectric separation layer comprises a dielectric separation layer selected from the group consisting of: a polyvinyl butyral layer and an ethylene-vinyl acetate layer.

12. The system defined in claim 11 further comprising conductive traces in the vehicle window that convey signals between the first and second electrical components.

13. The system defined in claim 12 wherein the conductive traces comprise portions of an infrared-light-blocking layer covering the window.

14. The system defined in claim 13 wherein the first and second clear solid dielectric layers comprise respective first and second glass layers and wherein the infrared-light blocking layer comprises a coating on a surface of the first glass layer.

15. The system defined in claim 13 wherein the infrared-light blocking layer comprises a silver layer on a polymer film that is embedded within the dielectric separation layer.

16. A vehicle, comprising:
a window that includes first and second solid dielectric layers separated by a dielectric separation layer;
an electrical component coupled to an interior surface of the window; and
electrical signal paths in the window that are in contact with the dielectric separation layer, wherein the second solid dielectric layer has an opening and wherein the electrical signal paths pass through the opening and are coupled to the electrical component.

17. The vehicle defined in claim 16 wherein the electrical component includes a camera.

18. The vehicle defined in claim 17 wherein the electrical signal paths comprise portions of a conductive thin-film coating.

19. The vehicle defined in claim 18 wherein the first and second solid dielectric layers comprise respective first and second glass layers, wherein the dielectric separation layer comprises a polymer layer, and wherein the thin-film coating forms at least part of an infrared-light-blocking layer.

20. A vehicle, comprising:
a window;
first and second electrical components, wherein the first electrical component is mounted to the window and generates data;
optical communications circuitry that transmits the data from the first electrical component to the second electrical component by transmitting light through the window; and
a circuit in the first electrical component that generates power for the optical communications circuitry.

* * * * *